United States Patent
Sanse et al.

(10) Patent No.: US 7,433,498 B2
(45) Date of Patent: Oct. 7, 2008

(54) APPARATUS, METHOD AND PROGRAM FOR GENERATING PHOTO CARD DATA

(75) Inventors: Takashi Sanse, Tokyo (JP); Satoshi Seto, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 685 days.

(21) Appl. No.: 10/935,738

(22) Filed: Sep. 8, 2004

(65) Prior Publication Data

US 2005/0058369 A1 Mar. 17, 2005

(30) Foreign Application Priority Data

Sep. 9, 2003 (JP) .............................. 2003-316595

(51) Int. Cl.
*G06K 9/00* (2006.01)
(52) U.S. Cl. ...................... 382/115; 382/117; 382/286; 340/5.52
(58) Field of Classification Search ................. 382/118, 382/115, 117, 116, 190, 305, 306, 180, 100, 382/286, 126; 380/23; 283/75, 77; 235/380; 340/5.52
See application file for complete search history.

(56) References Cited

U.S. PATENT DOCUMENTS

| | | | | | |
|---|---|---|---|---|---|
| 4,712,103 | A | * | 12/1987 | Gotanda | .................... 340/5.53 |
| 6,068,184 | A | * | 5/2000 | Barnett | ........................ 235/379 |
| 6,421,470 | B1 | * | 7/2002 | Nozaki et al. | ................ 382/321 |
| 6,430,306 | B2 | * | 8/2002 | Slocum et al. | .............. 382/118 |
| 7,110,575 | B2 | * | 9/2006 | Chen et al. | ................... 382/118 |
| 7,120,278 | B2 | * | 10/2006 | Sukegawa et al. | ........... 382/118 |
| 7,120,279 | B2 | * | 10/2006 | Chen et al. | ................... 382/118 |
| 2001/0026631 | A1 | * | 10/2001 | Slocum et al. | .............. 382/115 |

FOREIGN PATENT DOCUMENTS

| | | |
|---|---|---|
| JP | 6-199080 A | 7/1994 |
| JP | 2000-36032 A | 2/2000 |

* cited by examiner

*Primary Examiner*—Sheela C Chawan
(74) *Attorney, Agent, or Firm*—Sughrue Mion, PLLC (57) ABSTRACT

A photo card can be generated easily. An eye position detection unit detects positions of eye centers in a face image, and a normalization unit obtains a normalized face image by normalizing the distance between the positions of eye centers. A cutting unit cuts a card face image by setting a trimming frame having a predetermined standard size in the normalized face image, with reference to the distance between the positions of the eye centers in the normalized face image. A data generation unit generates card data from the card face image and personal information of a user, and a card printer generates the photo card by printing the card data on a blank card.

21 Claims, 11 Drawing Sheets

| 1 | 1 | 1 |
|---|---|---|
| 0 | 0 | 0 |
| -1 | -1 | -1 |

| 1 | 0 | -1 |
|---|---|---|
| 1 | 0 | -1 |
| 1 | 0 | -1 |

APPARATUS, METHOD AND PROGRAM FOR GENERATING PHOTO CARD DATA

BACKGROUND OF THE INVENTION

1. Field of the Invention

The present invention relates to an apparatus and a method for generating data used for a card having a face photo thereon (hereinafter referred to as a photo card) and to an apparatus and a method for generating the photo card. The present invention also relates to a program for causing a computer to execute the methods of generating the photo card data and the photo card.

2. Description of the Related Art

Photo ID cards having face photos for identifying individuals have been conventionally used (see Japanese Unexamined Patent Publication No. 6(1994)-199080). In order to generate such an ID card, a person is firstly photographed with a nametag representing the name of the person and a bar code of his/her employee identification number and the like, and the photograph is printed on printing paper. The face image and the bar code printed on the paper are then read with a scanner, and data files having property data such as the name and date of birth of all employees are searched, for the property data corresponding to the face image, according to the bar code that has been read. The property data found in this manner are output to a printing unit, and the printing unit prints the property data as character data on the ID card. According to internal processing, the printing unit also trims only the face image from image data that have been obtained by the scanner, and prints the trimmed data on the ID card.

Meanwhile, an automatic trimming apparatus has also been proposed for automatically trimming the face of a person from an image representing the upper half of the person so that the face is positioned in a predetermined position in a trimming frame of a predetermined size (see Japanese Unexamined Patent Publication No. 2000-36032). In this automatic trimming apparatus, the position of the face is determined in the following manner. Firstly, the top of the head is detected from the image representing the upper half of the person, and a skin-color area below the top of the head is extracted as a face image. A position of chin is then detected in the face image, and the position of the face is determined based on the top of the head and the position of the chin.

Furthermore, authentication of individuals has also been carried out. For authentication, personal information for identifying an individual is stored in an ID card, and the personal information is read from the ID card upon entering or leaving a security area or access to an information system. The personal information read in this manner is compared with personal information that has been pre-registered, to authenticate the individual. A card with a magnetic strip has been used for the ID card storing the personal information. In addition, a so-called IC card having a semi-conductor chip has also been proposed for storing such personal information therein.

In Japanese Unexamined Patent Publication No. 6(1994)-199080, only the face image is trimmed from the image data according to the internal processing that is not described specifically.

In Japanese Unexamined Patent Publication No. 2000-36032, how the face is trimmed is described specifically. However, accuracy of trimming becomes lower if a color of human skin is different among pictured subjects, since the trimming method uses the skin color.

In addition, in the case of photography of a person to obtain an image from which a face image is trimmed, a size and a position of the face included in the image may change according to a distance from a photographing apparatus and a position of the person in an angle of view at the time of photography (hereinafter collectively referred to as the photography position). If the size and the position of the face included in the face image change due to the photography position, trimming cannot be carried out with high accuracy. In this case, the photography position may be determined accurately at the time of photography. However, determining the photography position with high accuracy at each time of photography is extremely troublesome.

SUMMARY OF THE INVENTION

The present invention has been conceived based on consideration of the above circumstances. An object of the present invention is therefore to enable easy generation of a photo card.

A photo card data generation apparatus of the present invention is an apparatus for generating data used for a card having face image, and the photo card data generation apparatus comprises:

photography means for obtaining a face image by photographing the face of a person;

eye position detection means for detecting positions of eye centers in the face image;

normalization means for obtaining a normalized face image by normalizing the face image so as to cause a distance between the positions to become a predetermined value;

cutting means for cutting a card face image of a predetermined standard size from the normalized face image with reference to the distance between the positions of the eye centers in the normalized face image; and data generation means for generating the data for the card having the face image, based on the card face image and personal information of the person from which the face image has been obtained.

The predetermined standard size refers to a size that enables generation of a standardized image through printing by output means such as a printer having a predetermined resolution. In the standardized image, a face of a predetermined size is included in a predetermined position in an image of a predetermined size, and distances from edges of the face such as the top of the head, the tip of the chin, and ears to edges of the image are predetermined. The size of the image, the size of the face in the image, and the distances from the edges of the face to the edges of the image may have an error that is allowed within a predetermined range.

The photo card data generation apparatus of the present invention may further comprise personal information acquisition means for obtaining the personal information from external personal information storage means that stores personal information of a large number of people.

In the photo card data generation apparatus of the present invention, the eye position detection means may further comprise:

characteristic value calculation means for calculating at least one characteristic value used for recognizing the positions of the eye centers from the face image; and recognition means for recognizing the positions of the eye centers included in the face image by referring to reference data defining in advance the characteristic value or values and at least one recognition condition corresponding one to one to the characteristic value or values, based on the characteristic value or values calculated from the face image. The reference data are obtained by learning in advance the characteristic value or values included in sample image groups comprising non-face sample images and face sample images wherein positions of eye centers and/or a location relationship between eyes have been normalized, according to a machine learning method.

The characteristic value refers to a parameter representing a characteristic of an image. The characteristic may be any characteristic, such as a gradient vector representing a gradient of density of pixels in the image, color information (such as hue and saturation) of the pixels therein, density therein, a characteristic in texture therein, depth information thereof, and a characteristic of an edge in the image.

The recognition condition refers to a condition for recognizing the positions of the eye centers, based on the characteristic value or values.

The machine learning method can be any known method such as neural network and boosting.

A photo card generation apparatus of the present invention comprises printing means for generating the card having the face image by printing the data generated by the photo card data generation apparatus of the present invention.

In the case where the card has an information storage unit for storing various kinds of information including the personal information of the person, the photo card generation apparatus of the present invention may further comprise information recording means for recording the various kinds of information in the information storage unit.

A photo card data generation method of the present invention is a method of generating data used for a card having a face image, and the photo card data generation method comprises the steps of:

obtaining a face image by photographing the face of a person;

detecting positions of eye centers in the face image;

obtaining a normalized face image by normalizing the face image so as to cause a distance between the positions to become a predetermined value;

cutting a card face image of a predetermined standard size from the normalized face image with reference to the distance between the positions of the eye centers in the normalized face image; and generating the data for the card having the face image, based on the card face image and personal information of the person from which the face image has been obtained.

A photo card generation method of the present invention is a method of generating the card with the face image by printing the data generated according to the photo card data generation method of the present invention.

The photo card data generation method and the photo card generation method of the present invention may be provided as programs that cause a computer to execute the photo card data generation method and the photo card generation method.

According to the present invention, the face image is obtained by photographing the face of the person, and the positions of eye centers are detected in the face image. The face image is then normalized so as to cause the distance between the positions to become the predetermined value. The card face image having the predetermined standard size is then cut from the normalized face image with reference to the distance between the positions of eye centers in the normalized face image, and the data for the card are generated based on the card face image and the personal information of the person. The card is generated through printing of the data.

As has been described above, in the present invention, the face image is normalized to cause the distance between the positions of eye centers to become the predetermined value, and the card face image of the predetermined standard size is cut from the normalized face image with reference to the distance between the positions of eye centers in the normalized face image. Therefore, the card face image having the predetermined standard size can always be obtained regardless of a photography position of the person. Consequently, the card face image having the predetermined standard size can be cut with accuracy regardless of a varying size or position of the face included in the face image. In this manner, accurate determination of the photography position, which is troublesome, becomes unnecessary at the time of photography.

Furthermore, by obtaining the personal information from the external personal information storage means having the personal information of the large number of people, the personal information does not need to be managed individually by the photo card data generation apparatus, which can improve security of the personal information.

If the characteristic value calculation means and the recognition means are used, the characteristic value or values are calculated from the face image, and the positions of eye centers can be recognized in the face image with reference to the reference data according to the characteristic value or values calculated from the face image.

The face sample images used in the learning for obtaining the reference data have the normalized positions of eye centers and/or the normalized location relationship between eyes. Therefore, if a face position in the face image is recognized, the positions of eye centers in the face correspond to the positions of eye centers in each of the face sample images. Moreover, even if eyes in any of the face images are not clear due to occlusion by hair or the like, the face images respectively include the characteristic value or values representing the characteristic of the face. Therefore, the face position and the positions of eye centers can be recognized in the respective face images. As a result, the positions of eye centers in the respective face images can be recognized with accuracy.

Furthermore, by obtaining the reference data in advance through machine learning or the like, recognition performance regarding the positions of eye centers can be improved more.

DESCRIPTION OF THE PREFERRED EMBODIMENT

Figure 1:
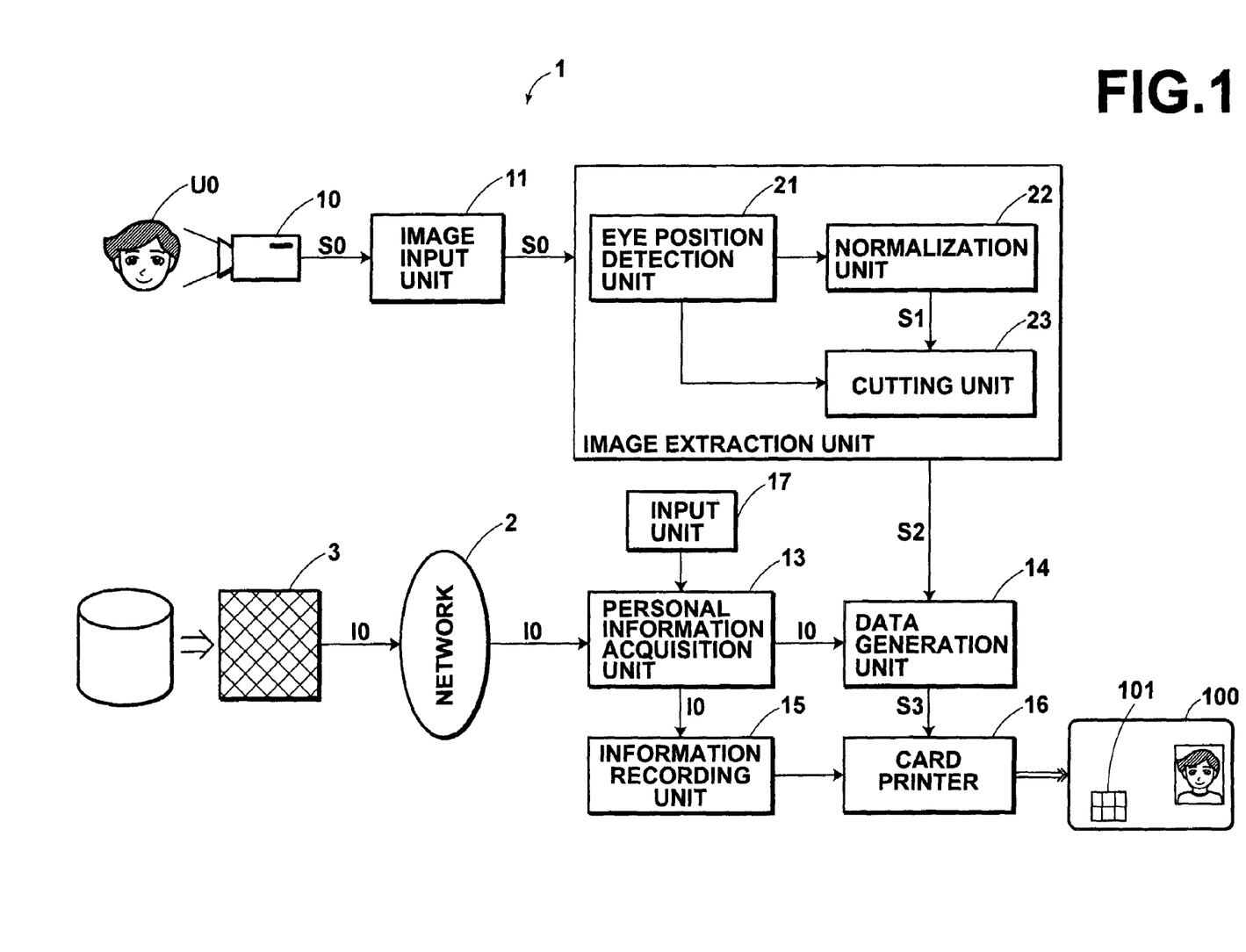
FIG. 1 is a block diagram showing the configuration of a photo card generation apparatus of an embodiment of the present invention.

Hereinafter, an embodiment of the present invention will be described with reference to the accompanying drawings. FIG. 1 is a block diagram showing the configuration of a photo card generation apparatus of the embodiment of the present invention. As shown in FIG. 1, a photo card generation apparatus 1 of this embodiment comprises a photography unit 10 such as a digital camera, an image input unit 11, an image extraction unit 12, a personal information acquisition unit 13, a data generation unit 14, an information recording unit 15, a card printer 16, and an input unit 17 such as a keyboard. The photography unit 10 obtains face image data S0 representing a face image by photographing the face of a user U0 whose photo card is to be generated. The image input unit 11 receives the face image data S0 obtained by the photography unit 10. The image extraction unit 12 extracts a card face image S2 having a predetermined standard size from the face image represented by the face image data S0 (hereinafter, the image represented by the face image data S0 is also referred to as the face image S0). The personal information acquisition unit 13 comprises a network interface for obtaining personal information I0 of the user U0 from an external personal information management server 3 that manages the personal information and is connected via a network 2. The data generation unit 14 generates card data S3 for generating a photo card 100 from the card face image S2 and the personal information I0. The information recording unit 15 records various kinds of information including the personal information I0 in an IC chip 101 added to a blank card. The card printer 16 generates the photo card 100 by printing the card data S3. The input unit 17 receives manual input of various kinds of information.

The photo card 100 to be generated in this embodiment refers to a driver's license, a card for resident registration network (referred to as Juki-net in Japan), an employee identification card, a student identification card, a passport, and a patient registration card, for example.

The image extraction unit 12 comprises an eye position detection unit 21, a normalization unit 22, and a cutting unit 23. The eye position detection unit 21 detects positions of eye centers included in the face represented by the face image S0. The normalization unit 22 obtains a normalized face image S1 by normalizing the face image S0 so as to cause a distance between the positions of eye centers to become a predetermined value. The cutting unit 23 cuts the card face image S2 having the predetermined standard size from the face image S0 with reference to the distance between the positions of eye centers in the normalized face image S1.

Figure 2:
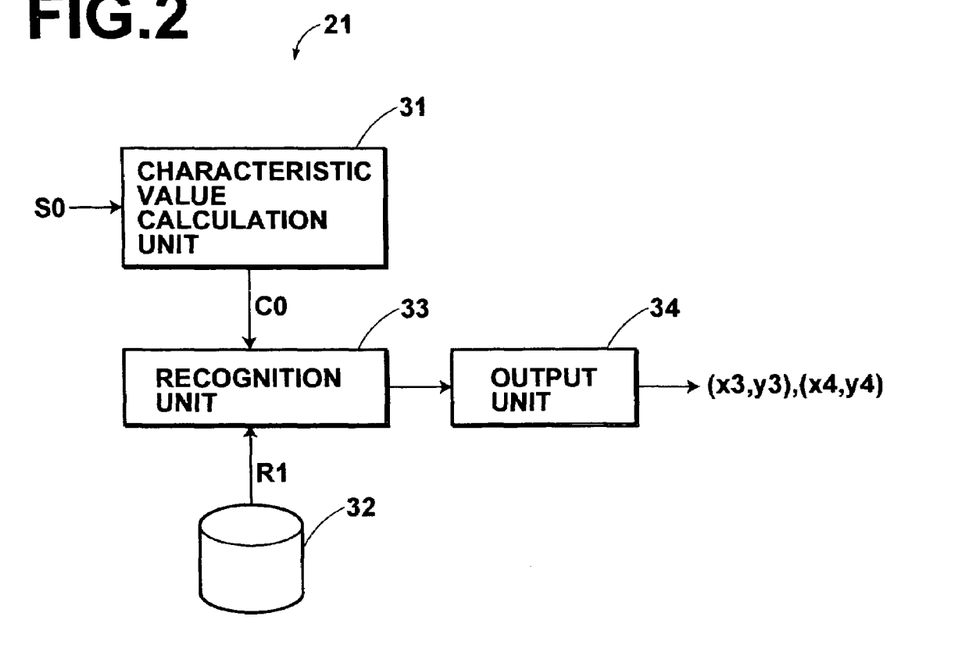
FIG. 2 is a block diagram showing the configuration of an eye position detection unit.

FIG. 2 is a block diagram showing the configuration of the eye position detection unit 21. As shown in FIG. 2, the eye position detection unit 21 comprises a characteristic value calculation unit 31, a memory 32, a recognition unit 33, and an output unit 34. The characteristic value calculation unit 31 calculates characteristic values C0 from the face image S0. The memory 32 stores reference data R1 that will be described later. The recognition unit 33 recognizes the positions of eye centers of the face included in the face image S0, based on the characteristic values C0 found by the characteristic value calculation unit 31 and the reference data R1 stored in the memory 32. The output unit 34 outputs a result of recognition by the recognition unit 33.

Figure 3A:
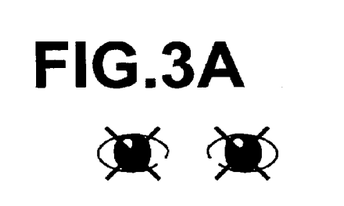
FIGS. 3A and 3B are illustrations respectively explaining positions of eye centers in the case where eyes are looking straight and in the case where eyes are looking right.
Figure 3B:
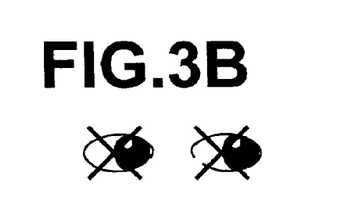

In this embodiment, each of the positions of eye centers refers to a center position between corner tail and inner corner of an eye. As shown in FIG. 3A, in the case of eyes looking straight, the positions refer to positions of pupils (shown by × in FIGS. 3A and 3B). In the case of eyes looking right as shown in FIG. 3B, the positions fall not on the pupils but on the whites of the eyes.

Figure 4A:
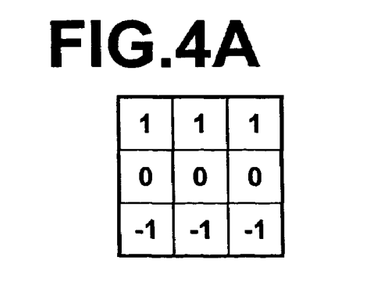
FIGS. 4A and 4B are diagrams respectively showing a horizontal edge detection filter and a vertical edge detection filter.
Figure 4B:
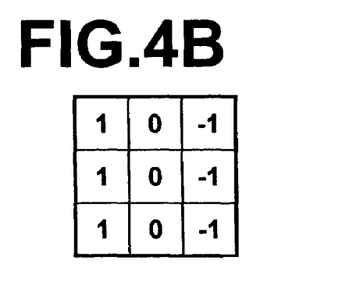
Figure 5:
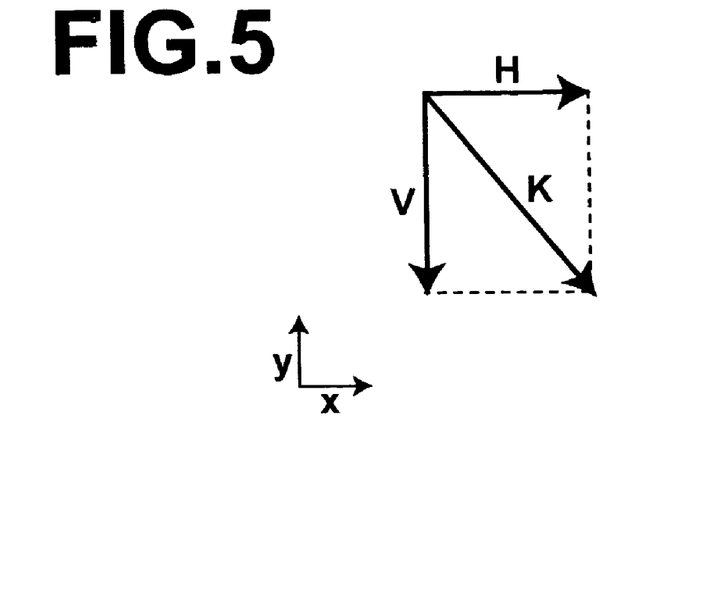
FIG. 5 is a diagram explaining calculation of gradient vectors.

The characteristic value calculation unit 31 calculates the characteristic values C0 from the face image S0, for recognition of the positions of eye centers. More specifically, gradient vectors K (that is, directions and magnitudes of changes in density of pixels in the face image S0) are calculated as the characteristic values C0. Hereinafter, how the gradient vectors K are calculated will be described. The characteristic value calculation unit 31 carries out filtering processing on the face image S0 by using a horizontal edge detection filter shown in FIG. 4A. In this manner, a horizontal edge H is detected in the face image S0. The characteristic value calculation unit 31 also carries out filtering processing on the face image S0 by using a vertical edge detection filter shown in FIG. 4B. In this manner, a vertical edge V is detected in the face image S0. The characteristic value calculation unit 31 then calculates the gradient vector K at each of the pixels as shown in FIG. 5, based on magnitudes of the horizontal edge H and the vertical edge V thereat. The characteristic value calculation unit 31 calculates the characteristic values C0 at each step of alteration of the face image S0 as will be described later.

Figure 6A:
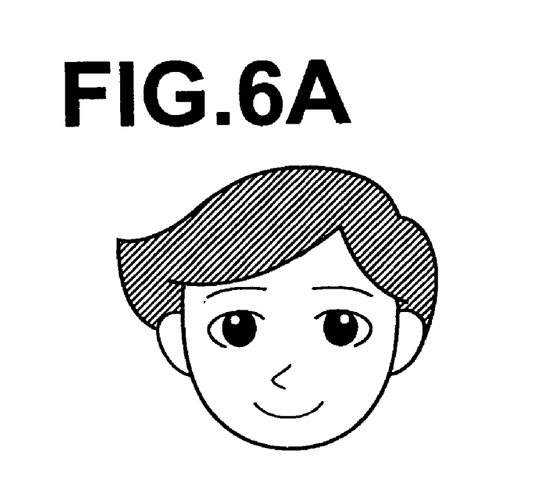
FIGS. 6A and 6B are illustrations for respectively representing a human face and the gradient vectors around eyes and mouth of the face.
Figure 6B:
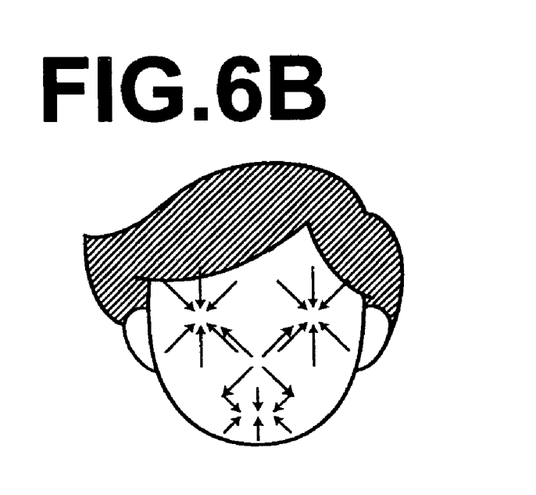

As shown in FIG. 6B, the gradient vectors K calculated in this manner point to the centers of eyes and mouth in dark areas such as eyes and mouth in the case where a face shown in FIG. 6A is used for the calculation. In a light area such as nose, the gradient vectors K point outward from the nose. Since the density changes more in the eyes than in the mouth, the magnitudes of the gradient vectors K are larger in the eyes than in the mouth.

The directions and the magnitudes of the gradient vectors K are used as the characteristic values C0. The directions of the gradient vectors K are represented by values ranging from 0 to 359 degrees from a predetermined direction (such as the direction x shown in FIG. 5).

Figure 7A:
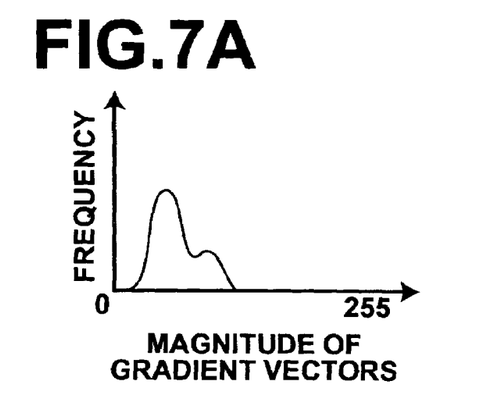
FIG. 7A is a histogram showing a magnitude of the gradient vector before normalization.
Figure 7B:
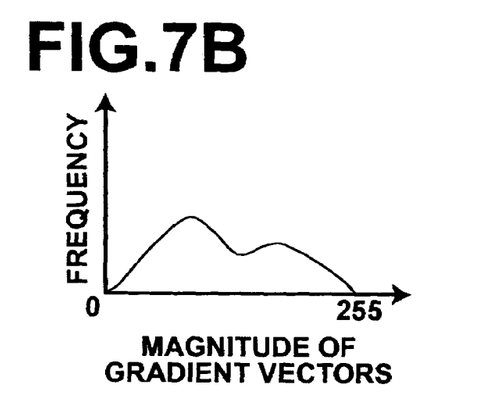
FIG. 7B is a histogram showing the magnitude after normalization.
Figure 7C:
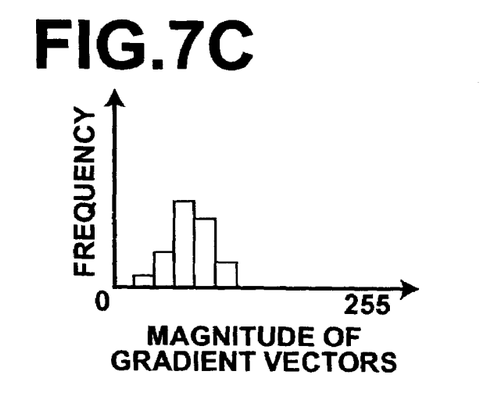
FIG. 7C is a histogram of the magnitude represented by 5 values.
Figure 7D:
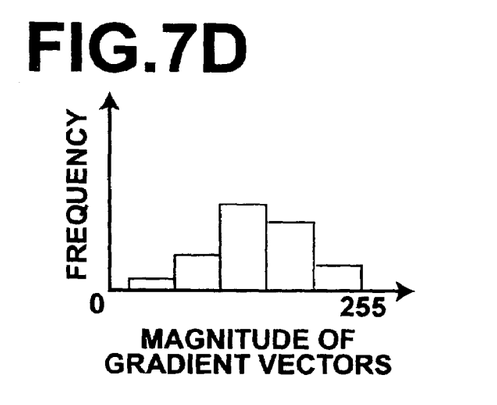
FIG. 7D is a histogram showing the magnitude represented by 5 values after normalization.

The magnitudes of the gradient vector K are normalized. For normalization thereof, a histogram of the magnitudes of the gradient vectors K at all the pixels in the face image S0 is generated, and the magnitudes are corrected by smoothing the histogram in such a manner that distribution of the magnitudes spreads over entire values that the pixels in the face image S0 can take (such as 0~255 in the case of 8-bit data). For example, if the magnitudes of the gradient vectors K are small and the values in the histogram are thus spread mainly in smaller values as shown in FIG. 7A, the magnitudes are normalized so that the magnitudes can spread over the entire values ranging from 0 to 255, as shown in FIG. 7B. In order to reduce an amount of calculations, a range of value distribution in the histogram is preferably divided into 5 ranges as shown in FIG. 7C so that normalization can be carried out in such a manner that the distribution in the 5 ranges spreads over ranges obtained by dividing the values 0~255 into 5 ranges as shown in FIG. 7D.

The reference data R1 stored in the memory 32 define a recognition condition for combinations of the characteristic values C0 at pixels in each of pixel groups of various kinds comprising a combination of pixels selected from sample images that will be described later.

The recognition condition and the combinations of the characteristic values C0 at the pixels comprising each of the pixel groups are predetermined through learning of sample image groups including face sample images and non-face sample images.

Figure 8:
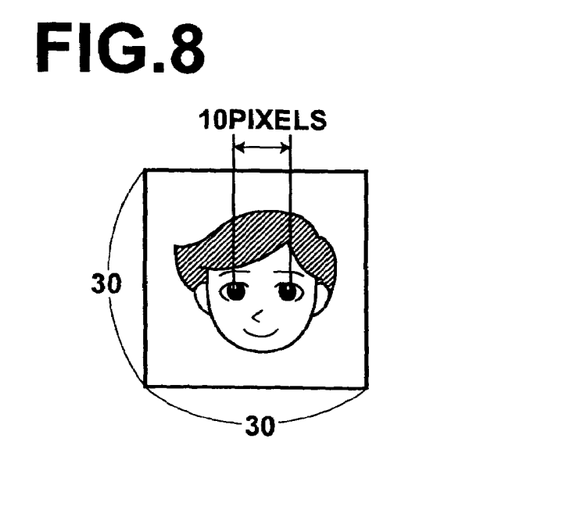
FIG. 8 shows an example of a face sample image used for learning reference data.

In this embodiment, when the reference data R1 are generated, dimensions of the face sample images are 30×30 pixels and the distance between the positions of eye centers is 10 pixels, as shown in FIG. 8. In all the face sample images, the positions of eye centers are the same. The positions of eye centers are represented by coordinates (x1, y1) for the right eye and (x2, y2) for the left eye whose origin is the upper left corner of the respective face sample images. The positions of eye centers in the face sample images used for learning the reference data R1 are the positions of eye centers to be recognized in this embodiment.

As the non-face sample images, any images having the same dimensions (30×30 pixels) are used.

Figure 9:
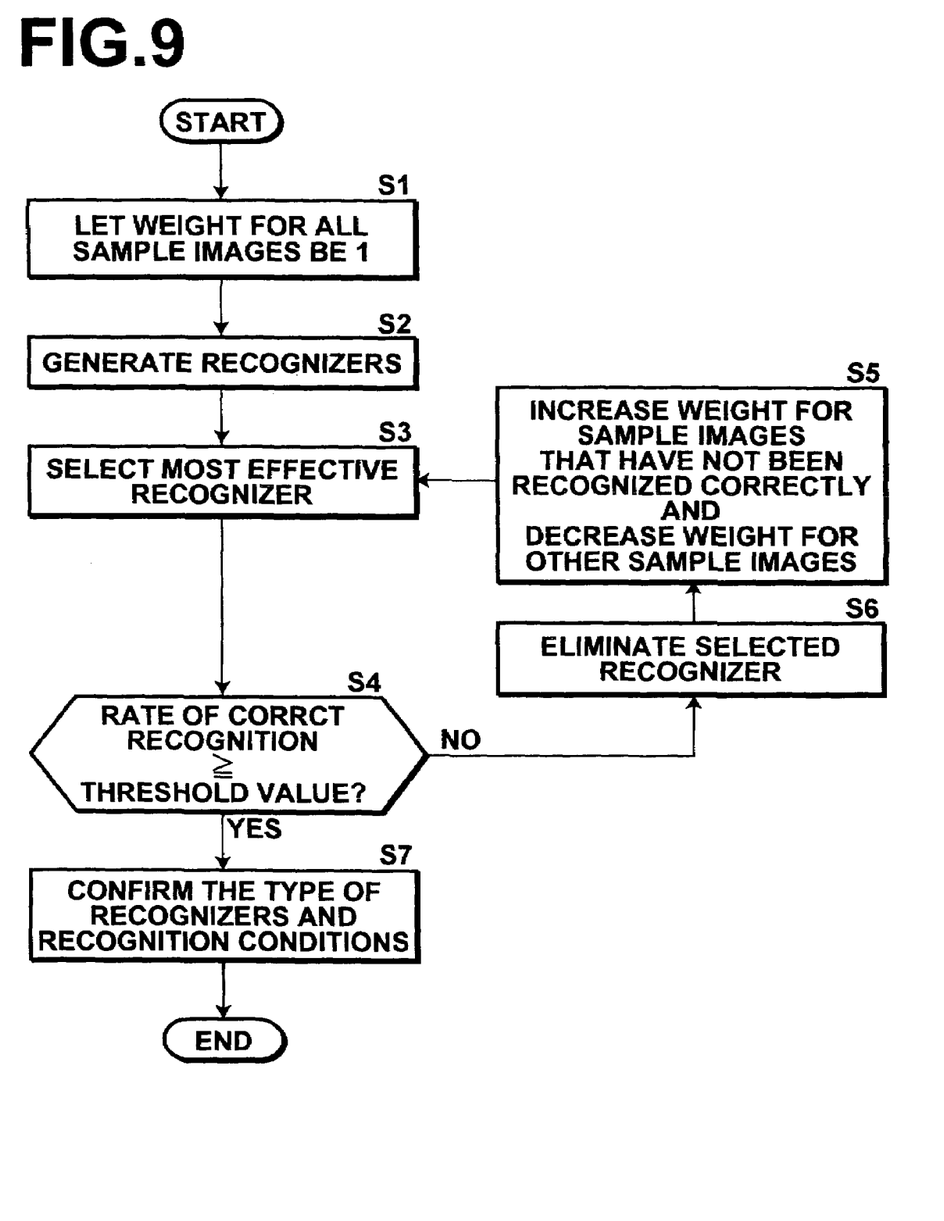
FIG. 9 is a flow chart showing a method of learning the reference data.

Hereinafter, the learning of the sample image groups will be described with reference to the flow chart in FIG. 9.

The sample image groups comprise the face sample images and the non-face sample images. A weight, that is, importance, is assigned to each of the sample images. The weight is initially set to 1 for all the sample images (Step S1).

A recognizer is generated for each of the pixel groups of the various kinds in the sample images (Step S2). The recognizer provides a criterion for recognizing whether each of the sample images represents a face image or a non-face image, by using the combinations of the characteristic values C0 at the pixels in each of the pixel groups. In this embodiment, a histogram of the combinations of the characteristic values C0 at the respective pixels corresponding to each of the pixel groups is used as the recognizer.

Figure 10:
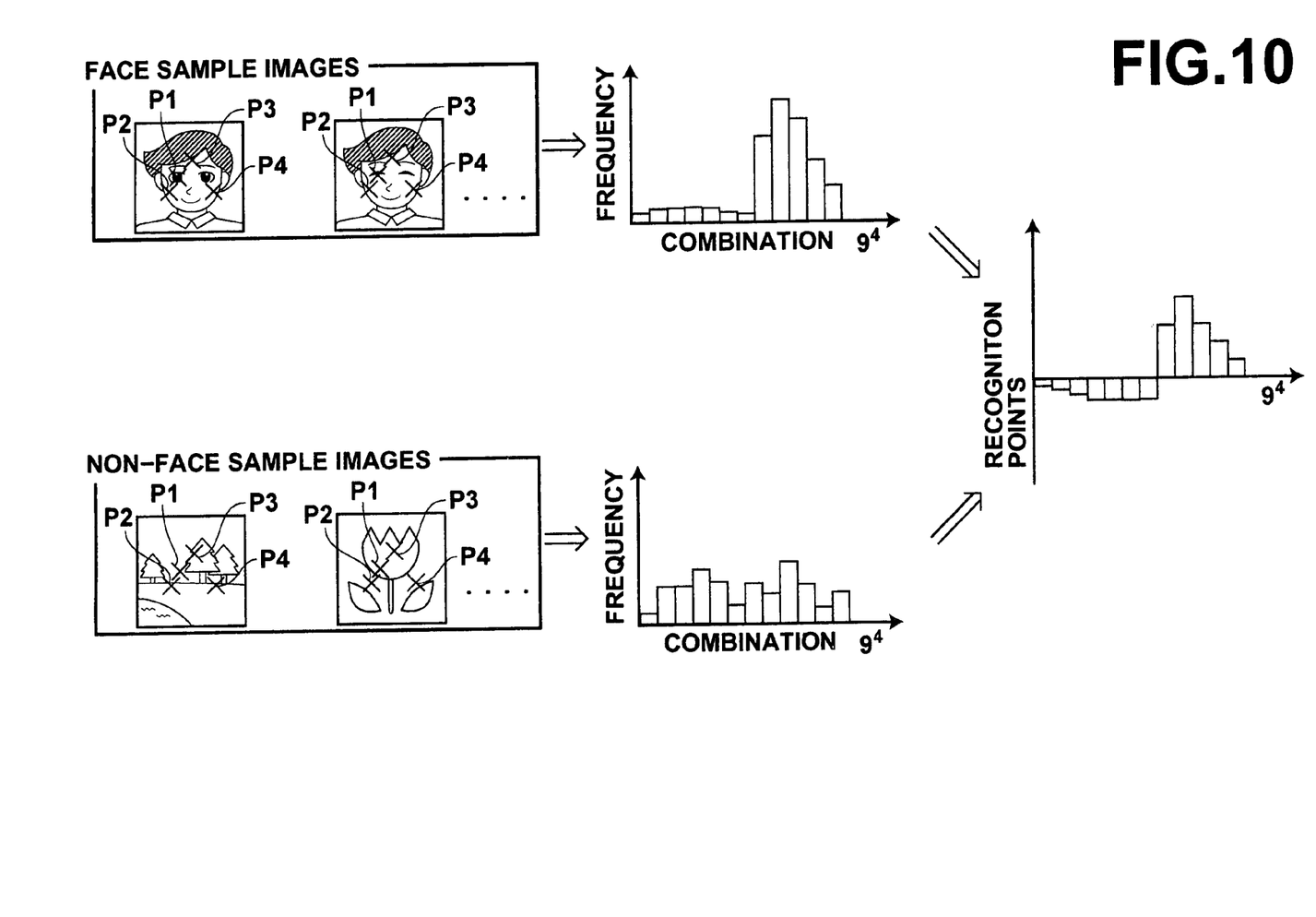
FIG. 10 is a diagram showing how a recognizer is generated.

How the recognizer is generated will be described with reference to FIG. 10. As shown by the sample images in the left of FIG. 10, the pixels comprising each of the pixel groups for generating the recognizer include a pixel P1 at the center of the right eye, a pixel P2 in the right cheek, a pixel P3 in the forehead, and a pixel P4 in the left cheek in the respective face sample images. The combinations of the characteristic values C0 are found at each of the pixels P1~P4 in the face sample images, and the histogram is generated. The characteristic values C0 represent the directions and the magnitudes of the gradient vectors K thereat. Therefore, since the direction ranges from 0 to 359 and the magnitude ranges from 0 to 255, the number of the combinations can be 360×256 for each of the pixels if the values are used as they are. The number of the combinations can then be (360×256)4 for the four pixels P1 to P4. As a result, the number of samples, memory, and time necessary for the learning and detection would be too large if the values were used as they are. For this reason, in this embodiment, the directions are represented by 4 values ranging from 0 to 3. If an original value of the direction is from 0 to 44 and from 315 to 359, the direction is represented by the value 0 that represents a rightward direction. Likewise, the original direction value ranging from 45 to 134 is represented by the value 1 that represents an upward direction. The original direction value ranging from 135 to 224 is represented by the value 2 that represents a leftward direction, and the original direction value ranging from 225 to 314 is represented by the value 3 that represents a downward direction. The magnitudes are also represented by 3 values ranging from 0 to 2. A combination value is then calculated according to the equation below:

value of combination=0 if the magnitude is 0 and, value of combination=(the direction value+1)×(the magnitude value) if the magnitude value>0.

In this manner, the number of combinations becomes 94, which can reduce the number of data of the characteristic values C0.

Likewise, the histogram is generated for the non-face sample images. For the non-face sample images, pixels corresponding to the positions of the pixels P1 to P4 in the face sample images are used. A histogram of logarithms of a ratio of frequencies in the two histograms is generated as shown in the right of FIG. 10, and is used as the recognizer. Values of the vertical axis of the histogram used as the recognizer are referred to as recognition points. According to the recognizer, the larger the absolute values of the recognition points that are positive, the higher the likelihood becomes that an image showing a distribution of the characteristic values C0 corresponding to the positive recognition points represents a face. On the contrary, the larger the absolute values of the recognition points that are negative, the higher the likelihood becomes that an image showing a distribution of the characteristic values C0 corresponding to the negative recognition points does not represent a face. At Step S2, the recognizers are generated in the form of the histograms for the combinations of the characteristic values C0 at the respective pixels in the pixel groups of various kinds that can be used for recognition.

One of the recognizers generated at Step S2 is selected that can be used most effectively for recognizing the face or non-face images. This selection of the most effective recognizer is made in consideration of the weight of each of the sample images. In this example, a weighted correct recognition rate is compared between the recognizers, and the recognizer having the highest weighted correct recognition rate is selected (Step S3). More specifically, the weight for each of the sample images is 1 at Step S3 when the procedure at Step S3 is carried out for the first time. Therefore, the recognizer by which the number of the sample images recognized as the face or non-face images becomes the largest is selected as the most effective recognizer. In the procedure at Step S3 carried out for the second time or later after Step S5 whereat the weight is updated for each of the sample images as will be described later, the sample images have the various weights such as 1, larger than 1, or smaller than 1. The sample images whose weight is larger than 1 contributes more than the sample images whose weight is smaller than 1, when the correct recognition rate is evaluated. In this manner, in the procedure at Step S3 after Step S5, right recognition of the sample images whose weight is larger is more emphasized.

Judgment is made as to whether the correct recognition rate of a combination of the recognizers that have been selected exceeds a predetermined threshold value (Step S4). In other words, a rate representing how correctly each of the sample images is recognized as the face image or non-face image by using the combination of the recognizers that have been selected is examined. For this evaluation of the correct recognition rate, the sample images having the current weight or the sample images having the same weight may be used. In the case where the correct recognition rate exceeds the predetermined threshold value, recognition of the face image or non-face image can be carried out at a probability that is high enough, by using the recognizers that have been selected. Therefore, the learning ends. If the result is equal to or smaller than the threshold value, the procedure goes to Step S6 for further selecting another one of the recognizers to be combined with the recognizers that have been selected.

At Step S6, the recognizer that has been selected immediately at Step S3 is excluded, so that the same recognizer is not selected again.

The weight of the sample images which have not been recognized correctly as the face images or the non-face images by the recognizer selected immediately at Step S3 are weighted more while the sample images whose recognition was correct at Step S3 are weighted less (Step S5). This procedure is carried out because the sample images whose recognition was not correctly carried out by the recognizers that have been selected are used more importantly than the sample images of correct recognition in the selection of the additional recognizer. In this manner, the recognizer than can carry out correct recognition on the heavily weighted sample images is selected in order to improve effectiveness of the combination of the recognizers.

The procedure then goes back to Step S3, and the effective recognizer is selected based on the weighted correct recognition rate, as has been described above.

If the correct recognition rate exceeds the predetermined threshold value at Step S4 when the recognizers corresponding to the combinations of the characteristic values at the respective pixels in a specific one of the pixel groups is selected as the recognizers that are appropriate for recognizing presence or absence of face by repeating the procedure from Step S3 to Step S6, the type of the recognizers and the recognition conditions used for recognition of presence or absence of face are confirmed (Step S7) to end the learning of the reference data R1.

If the learning method described above is used, the recognizers can be any recognizers other than the histograms described above, as long as the recognizers can provide a criterion for distinction of face images and non-face images by using the combinations of the characteristic values C0 at the respective pixels comprising a specific one of the pixel groups. For example, the recognizers can be binary data, or threshold values, or functions. In the case of a histogram, a histogram representing distribution of differences between the histograms shown in the middle of FIG. 10 may also be used.

The method of learning is not necessarily limited to the method described above. A machine learning method such as neural network may also be adopted.

The recognition unit 33 finds the recognition points in the face image S0 for all the combinations of the characteristic values C0 at the respective pixels comprising each of the pixel groups, with reference to the recognition conditions learned from the reference data R1 regarding all the combinations of the characteristic values C0 at the respective pixels comprising the pixel groups. The positions of eye centers in the face are recognized through consideration of all the recognition points. At this time, the directions and the magnitudes of the gradient vectors K as the characteristic values C0 are represented by the 4 values and the 3 values, respectively.

Figure 11:
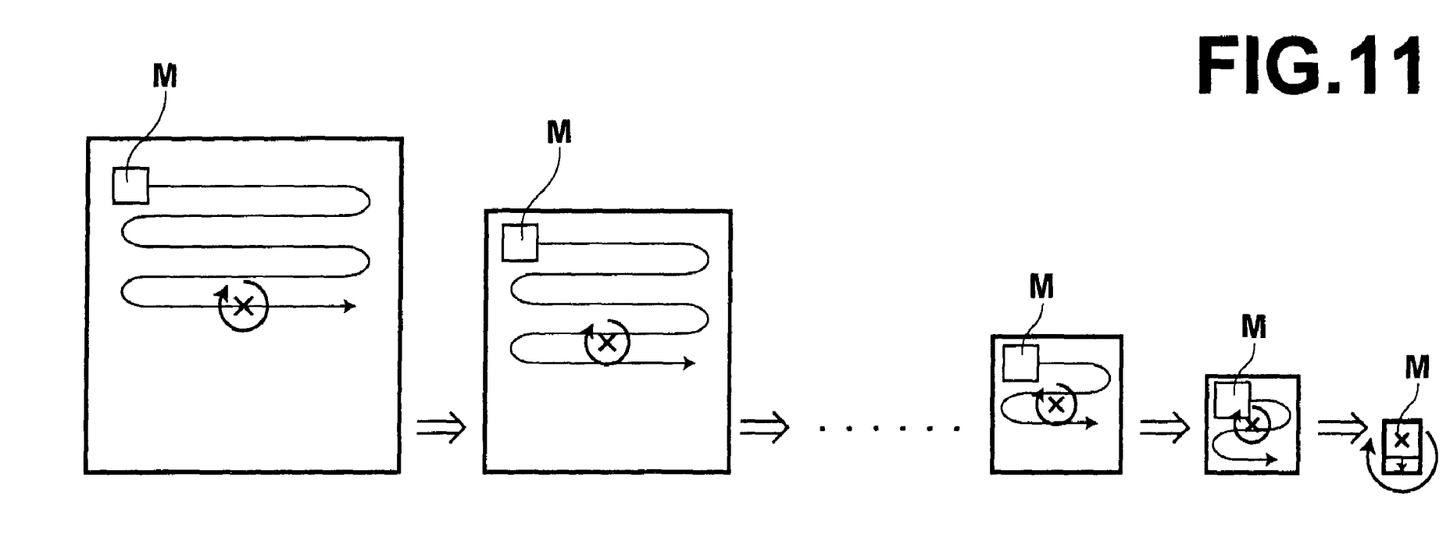
FIG. 11 is a diagram showing a stepwise alteration of a face image.

The face in the face image S0 may have a different size from the faces in the sample images of 30×30 pixels. Furthermore, an angle of rotation of the face in two dimensions may not necessarily be 0. For this reason, the recognition unit 33 enlarges or reduces the face image S0 in a stepwise manner as shown in FIG. 11 (showing the case of reduction), for causing the vertical or horizontal dimension of the face image S0 to become 30 pixels (or smaller if necessary) while rotating the face image S0 by 360 degrees in a stepwise manner. A mask M whose dimensions are 30×30 pixels is set in the face image S0 enlarged or reduced at each of the steps, and the mask M is shifted pixel by pixel in the enlarged or reduced face image S0 for recognition of the positions of eye centers in the mask.

The characteristic value calculation unit 31 calculates the characteristic values C0 at each of the steps of the alteration caused by the enlargement or reduction and the rotation.

In this embodiment, the recognition points are added at the respective steps of alteration of the face image, and a face of the dimensions corresponding to the sample images is judged to exist within the mask M of 30×30 pixels at the step of alteration generating the largest recognition points after the addition. Therefore, coordinates whose origin is at the upper left corner are set in the image in the mask M, and positions corresponding to the positions of eye centers (x1, y1) and (x2, y2) in the sample images are found. The positions corresponding to the coordinates before alteration are judged to be the positions of eye centers in the face image S0. The positions of eye centers are represented by (x3, y3) and (x4, y4) for the right and left eyes in the face in the face image S0. In this case, y3=y4.

The output unit 34 outputs the coordinates (x3, y3) and (x4, y4) representing the positions of eye centers recognized by the recognition unit 33.

The normalization unit 22 calculates a distance D0 between the positions of eye centers detected in the face image S0 by the eye position detection unit 21, based on the coordinates (x3, y3) and (x4, y4) thereof. The normalization unit 22 obtains the normalized face image S1 by normalizing the face image S0 through enlargement or reduction thereof so that the distance D0 becomes a predetermined distance D1. Since y3=y4, the number of pixels between the positions of eye centers in the face image S0 is represented by (x4−x3). The predetermined distance D1 is set to the number of pixels that can generate the card face image S2 of the predetermined standard size that will be described later. In the normalized face image S1, the distance between the positions of eye centers is D1. The positions of eye centers in the normalized face image S1 can be calculated according to a magnification rate used at the time of the enlargement or reduction, and are represented by coordinates (x5, y5) and (x6, y6) for right and left eyes in the normalized face image S1, respectively. Since y5=y6, the number of pixels between the positions of eye centers in the normalized face image S1 is represented by (x5−x6).

Figure 12:
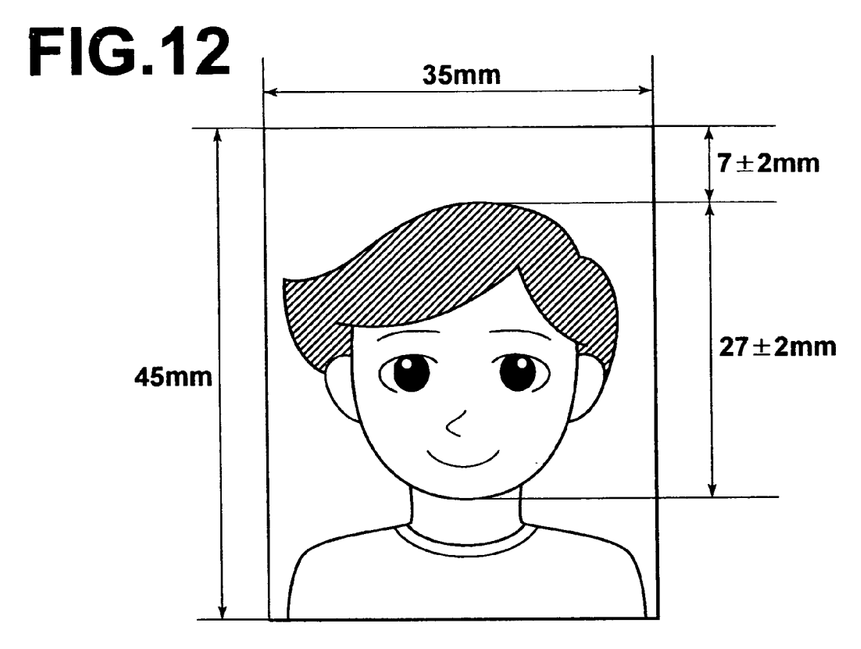
FIG. 12 is a diagram showing a predetermined standard size used for cutting a card face image.
Figure 13:
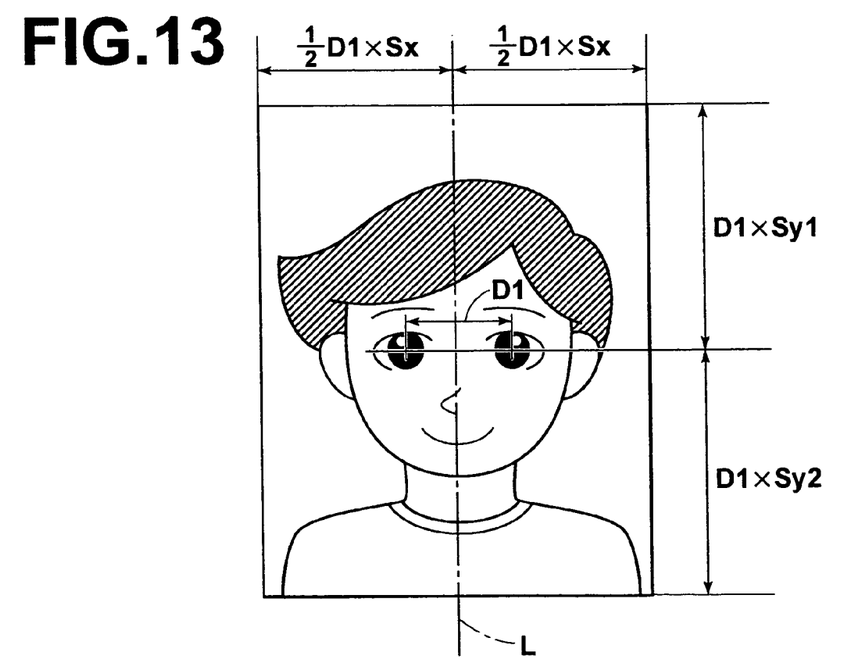
FIG. 13 shows how the card face image is cut.

The cutting unit 23 cuts the card face image S2 of the predetermined standard size from the normalized face image S1 so that the card face image S2 looks as shown in FIG. 12 when the photo card 100 is generated. In the card face image S2, the length of the face (that is, the distance between the top of the head and the tip of the chin) is 27±2 mm, and a distance from the top of the head to the upper side of a trimming frame is 7±2 mm. A horizontal length is 35 mm while a vertical length is 45 mm. More specifically, the card face image S2 is cut from the normalized face image S1 in the following manner. FIG. 13 is a diagram showing how the card face image S2 is cut. As shown in FIG. 13, the cutting unit 23 sets a perpendicular bisector L of the distance D1 between the positions of eye centers in the normalized face image S1. At this time, the cutting unit 23 has a parameter Sx for determining positions of the left and right sides of the trimming frame. Therefore, the cutting unit 23 determines the positions of the left and right sides of the trimming frame at positions where distances from the perpendicular bisector L thereto are represented by 1/2D1×Sx.

The cutting unit 23 also has parameters Sy1 and Sy2 for determining positions of the upper and lower sides of the trimming frame. The cutting unit 23 therefore sets the upper side of the trimming frame on the position where a distance thereto from the y coordinates y5 and y6 is D1×Sy1, and sets the lower side thereof to the position where a distance thereto from the y coordinates y5 and y6 is D1×Sy2.

The parameter Sx is determined so as to minimize an error between D1×Sx and D10+D11 where D10 and D11 respectively represent distances from the perpendicular bisector L to the left and right sides of sample images having a size that can generate the image having the predetermined standard size shown in FIG. 12 upon printing thereof while the distance between the positions of eye centers is normalized to D1.

The parameter Sy1 is determined so as to minimize an error between D1×Sy1 and D12 where D12 represents a distance from the y coordinate of the positions of eye centers to the upper side of the sample images having a size that can generate the image having the predetermined standard size shown in FIG. 12 upon printing thereof while the distance between the positions of the eye centers is normalized to D1.

The parameter Sy2 is determined so as to minimize an error between D1×Sy2 and D13 where D13 represents a distance from the y coordinate of the positions of eye centers to the lower side of the sample images having a size that can generate the image having the predetermined standard size shown in FIG. 12 upon printing thereof while the distance between the positions of the eye centers is normalized to D1.

More specifically, the parameters Sx, Sy1 and Sy2 whose ratio Sx:Sy1:Sy2=5.04:3.01:3.47 are used.

The personal information acquisition unit 13 accesses the external personal information management server 3 that manages the personal information of a large number of people via the network 2, and obtains the personal information I0 of the user U0 whose photo card 100 is to be generated. More specifically, when the user U0 inputs information for identifying the user U0 (such as the name, or a driver's license number in the case where the photo card 100 is a driver's license, or a passport number in the case of the photo card 100 being a passport, and a resident registration network number in the case of the photo card 100 being a resident registration card, for example) by using the input unit 17, and the personal information acquisition unit 13 sends the information for identifying the user U0 to the personal information management server 3. The personal information management server 3 then searches for the personal information I0 according to the information of the user U0, and sends the personal information I0 to the personal information acquisition unit 13. In this manner, the personal information acquisition unit 13 can obtain the personal information I0 of the user U0. For this reason, the personal information management server 3 stores the personal information of the large number of people in relation to information for identifying the individuals.

Figure 14:
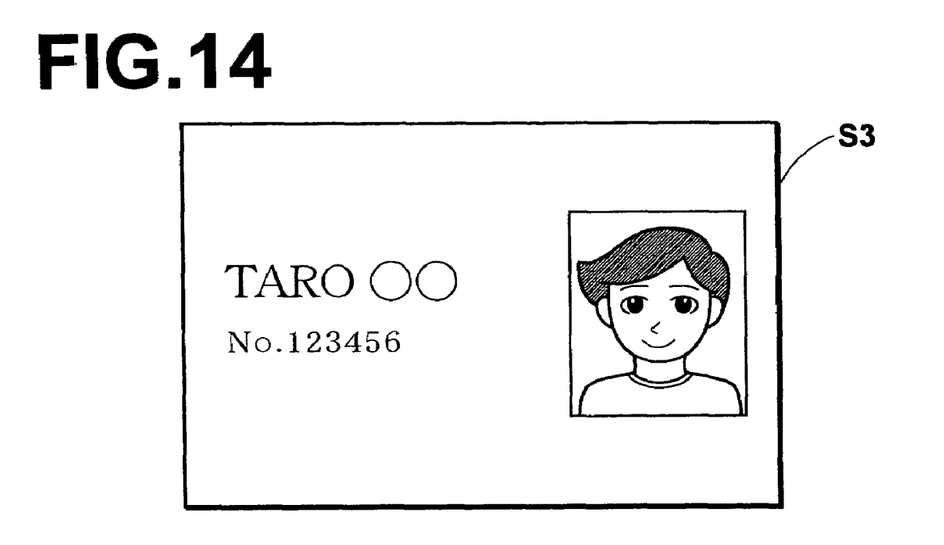
FIG. 14 shows an image represented by the card data.

The data generation unit 14 combines the card face image S2 with the personal information I0, and generates the card data S3 having a format enabling printing of the face image, the name, the address, and a personal identification number of the user U0 on the blank card. For example, as shown in FIG. 14, the data generation unit 14 generates the card data S3 so that the name and the number can be printed on the left of the card while the face image of the user U0 can be printed on the right. The card data S3 may also include a logo or the name of a government office, a company, a hospital, a school or the like that issues the photo card 100. The logo or the name may also be printed on the blank card in advance.

The information recording unit 15 records the personal information I0 of the user U0 in the IC chip 101 of the blank card.

The card printer 16 generates the photo card 100 by printing the card data S3 on the blank card having the IC chip 101 storing the personal information I0.

Figure 15:
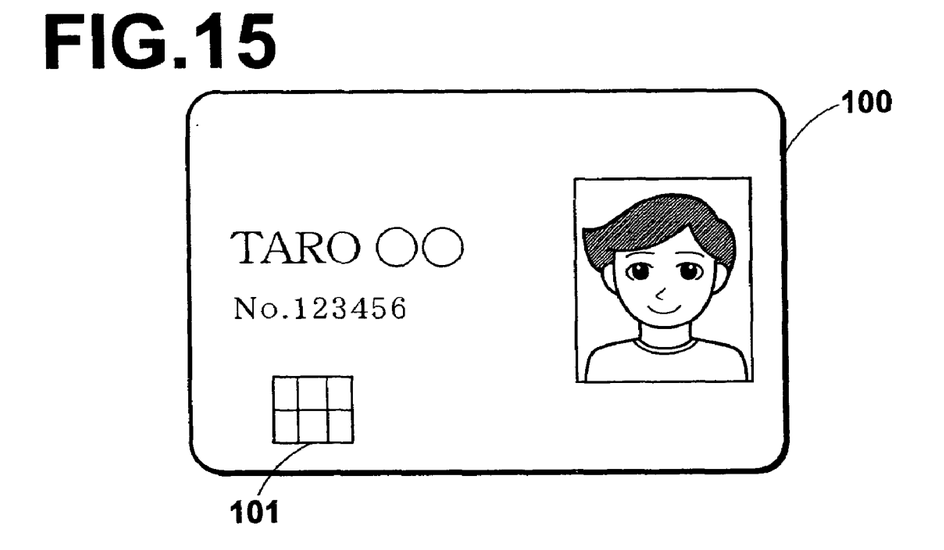
FIG. 15 shows an example of a photo card.

FIG. 15 shows an example of the photo card 100. As shown in FIG. 15, the photo card 100 has the IC chip 101 wherein the information recording unit 15 records the personal information I0 of the user U0. The name and the number of the user U0 are printed on the left of the photo card 100, while the face image of the user U0 is printed on the right thereof.

Figure 16:
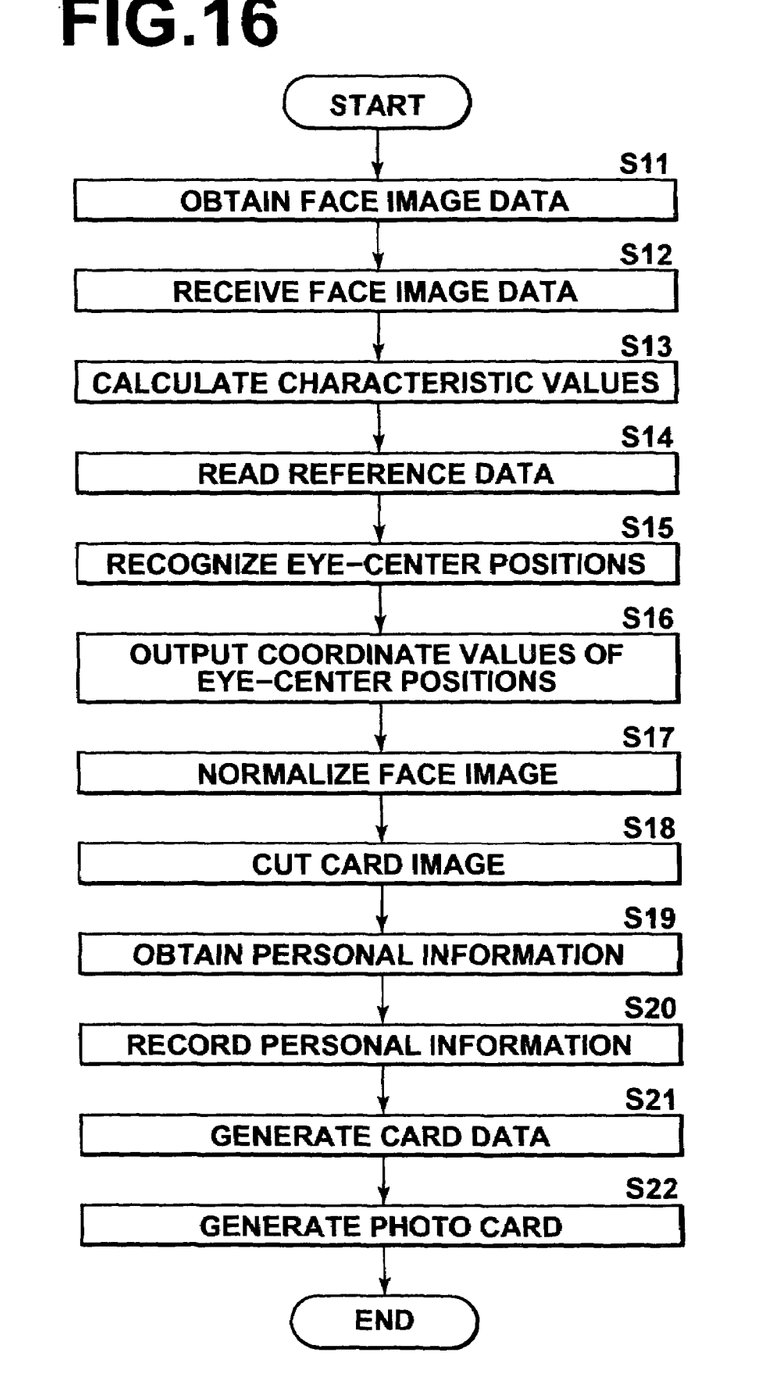
FIG. 16 is a flow chart showing a procedure carried out in the embodiment.

A procedure carried out in this embodiment will be described next. FIG. 16 is a flow chart showing the procedure.

The photography unit 10 photographs the face of the user U0 whose photo card 100 is to be generated, and obtains the face image data S0 (Step S11). The image input unit 12 receives the face image data S0 of the user U0 (Step S12). The characteristic value calculation unit 31 of the eye position detection unit 21 in the image extraction unit 12 calculates the directions and the magnitudes of the gradient vectors K in the face image S0 as the characteristic values C0 at each step of enlargement/reduction and rotation of the face image S0 (Step S13). The recognition unit 33 reads the reference data R1 from the memory 32 (Step S14), and recognizes the positions of eye centers in the face image S0 (Step S15). The output unit 34 outputs the coordinate values of the positions of eye centers (Step S16).

The normalization unit 22 normalizes the face image S0 so as to cause the distance D0 between the positions of eye centers to become the value D1, and obtains the normalized face image S (Step S17). The cutting unit 23 cuts the card face image S2 having the predetermined standard size shown in FIG. 12 from the normalized face image S1 with reference to the distance D1 between the positions of eye centers in the normalized face image S1 (Step S18).

The information for identifying the user U0 is input from the input unit 17, and the personal information acquisition unit 13 obtains the personal information I0 of the user U0 by accessing the personal information management server 3 (Step S19). This step of personal information acquisition may be carried out in parallel to Steps S11 to S18 or before Step S11.

The information recording unit 15 records the personal information I0 in the IC chip 101 on the blank card (Step S20).

The data generation unit 14 generates the card data S3 by combining the card face image S2 and the personal information I0 (Step S21), and the card printer 16 generates the photo card 100 by printing the card data S3 on the blank card (Step S22) to end the procedure.

The photo card 100 generated in this manner is provided to the user U0 after confirmation of agreement between the face of the user U0 and the face image printed on the photo card 100.

Figure 17A:
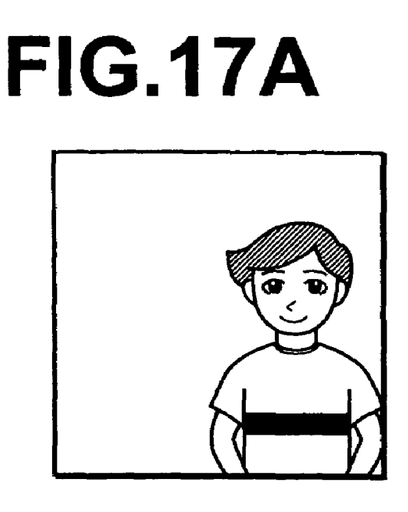
FIGS. 17A and 17B show examples of the face image.
Figure 17B:
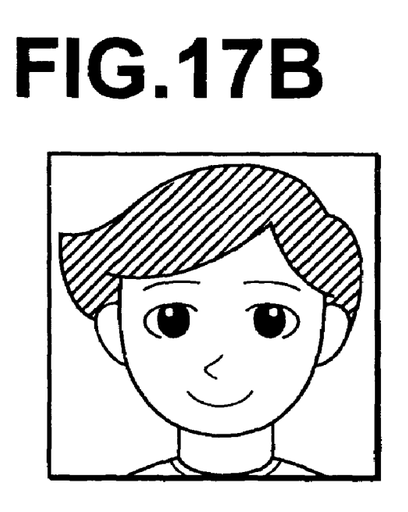

As has been described above, according to this embodiment, the face image S0 is normalized so as to cause the distance between the positions of eye centers to become the predetermined value, and the card face image S2 having the predetermined standard size is cut thereafter from the normalized face image S1 with reference to the distance D1 between the positions of eye centers in the normalized face image S1. Therefore, the card face image S2 having the predetermined standard size can always be generated regardless of a photography position of the user U0. For example, if the face is not positioned at the center of the face image S0 as shown in FIG. 17A, or if only the face is included fully in the face image S0 as shown in FIG. 17B, the card face image S2 can be generated so as to cause the card face image to have the predetermined standard size. Furthermore, even in the case where the face image represented by the face image data S0 has a varying size or position, the card face image S2 having the predetermined standard size can be cut with accuracy. In this manner, troubles caused by necessity of accurate positioning of the person can be avoided at the time of photography.

In the above embodiment, the positions of eye centers are detected by using the result of machine learning. However, any method such as template matching using a template having a shape of eye can be used, as long as the method enables detection of the positions of eye centers.

Although the predetermined standard size generating the face image shown in FIG. 12 is used in this embodiment, the predetermined standard size is not necessarily limited to this size. Any size can be used, and the values of the parameters Sx, Sy1, and Sy2 for determining the trimming frame shown in FIG. 13 are determined according to the size.

In the above embodiment, the personal information I0 is obtained by accessing the external personal information management server 3. However, the card generation apparatus 1 may have a memory for storing the personal information of the large number of people so that the photo card 100 can be generated without acquisition of the personal information I0 from the external server.

The personal information I0 of the user U0 is stored in the IC chip 101 of the photo card 100 in the above embodiment. However, instead of the IC chip 101, a magnetic strip may be attached to the photocard 100 for storing the personal information. Alternatively, without using the IC chip 101 or the magnetic strip, the photo card 100 may be generated so as to have the face image and the personal information of the user U0 printed thereon. In this case, the card generation apparatus 1 does not need to have the personal information acquisition unit 13 and the memory for storing the personal information.

Although the embodiment of the present invention has been described above, the present invention may be embodied as a program for causing a computer to function as the image input unit 11, the image extraction unit 12, the personal information acquisition unit 13, the data generation unit 14, and the information recording unit 15 and for causing the computer to carry out the processing for generating the card data S3 and the photo card 100. A computer-readable recording medium storing such a program is also an embodiment of the present invention.

What is claimed is:

1. A photo card data generation apparatus for generating data used for a card having a face image, the photo card data generation apparatus comprising:

photography means for obtaining a face image by photographing the face of a person;

eye position detection means for detecting positions of eye centers in the face image;

normalization means for obtaining a normalized face image by normalizing the face image so as to cause a distance between the positions to become a predetermined value;

cutting means for cutting a card face image of a predetermined standard size from the normalized face image with reference to the distance between the positions of the eye centers in the normalized face image;

data generation means for generating the data for the card having the face image, based on the card face image and personal information of the person from which the face image has been obtained;

characteristic value calculation means for calculating at least one characteristic value used for recognizing the positions of the eye centers from the face image, wherein the characteristic value or values are at least one of a gradient vector representing a gradient of density of pixels in the sample images or the face image, color information of the pixels therein, density therein, a characteristic in texture therein, depth information thereof, and a characteristic of an edge therein.

2. The photo card data generation apparatus according to claim 1, further comprising personal information acquisition means for obtaining the personal information from external personal information storage means storing personal information of a large number of people.

3. A photo card generation apparatus comprising printing means for generating the card by printing the data generated by the photo card data generation apparatus of claim 2.

4. The photo card generation apparatus according to claim 3, further comprising information recording means for recording various kinds of information including the personal information of the person in an information storage unit in the case where the card has the information storage unit for storing the various kinds of information.

5. The photo card generation apparatus according to claim 4, wherein the information storage unit is an IC chip or a magnetic strip.

6. The photo card data generation apparatus according to claim 1, the eye position detection means further comprising:

characteristic value calculation means for calculating at least one characteristic value used for recognizing the positions of the eye centers from the face image; and recognition means for recognizing the positions of the eye centers included in the face image by referring to reference data defining in advance the characteristic value or values and at least one recognition condition corresponding one to one to the characteristic value or values, based on the characteristic value or values calculated from the face image, the reference data having been obtained by learning in advance according to a machine learning method the characteristic value or values included in sample image groups comprising non-face sample images and face sample images wherein positions of eye centers and/or a location relationship between eyes have been normalized.

7. A photo card generation apparatus comprising printing means for generating the card by printing the data generated by the photo card data generation apparatus of claim 6.

8. The photo card generation apparatus according to claim 7, further comprising information recording means for recording various kinds of information including the personal information of the person in an information storage unit in the case where the card has the information storage unit for storing the various kinds of information.

9. The photo card generation apparatus according to claim 8, wherein the information storage unit is an IC chip or a magnetic strip.

10. A photo card generation apparatus comprising printing means for generating the photo card by printing the data generated by the photo card data generation apparatus of claim 1.

11. The photo card generation apparatus according to claim 10, further comprising information recording means for recording various kinds of information including the personal information of the person in an information storage unit in the case where the card has the information storage unit for storing the various kinds of information.

12. The photo card generation apparatus according to claim 11, wherein the information storage unit is an IC chip or a magnetic strip.

13. The photo generation apparatus according to claim 11, wherein the personal information comprises at least one of: name, identification number, and address.

14. A photo card data generation apparatus according to claim 1, where said normalization means adjusts a size of the face image to cause the distance between the centers of the eyes to become the predetermined value.

15. A photo generation apparatus according to claim 14, wherein the predetermined value is common across multiple face images.

16. The apparatus of claim 15, wherein the cutting means determines a boundary in relation to a lateral bisection of the distance between the centers of the eyes.

17. A photo card data generation apparatus according to claim 1:
wherein said predetermined value of a distance between the position of eye centers in the face image for normalization is a fixed amount of pixels; and
wherein said predetermined standard size for cutting a card face image from the normalized face image is a fixed amount of pixels×a fixed amount of pixels.

18. A photo card data generation method for generating data used for a card having a face image, the photo card data generation method comprising the steps of:
obtaining a face image by photographing the face of a person; detecting positions of eye centers in the face image;
obtaining a normalized face image by normalizing the face image so as to cause a distance between the positions to become a predetermined value;
cutting a card face image of a predetermined standard size from the normalized face image with reference to the distance between the positions of the eye centers in the normalized face image;
generating the data for the card having the face image, based on the card face image and personal information of the person from which the face image has been obtained;
characteristic value calculation means for calculating at least one characteristic value used for recognizing the positions of the eye centers from the face image, wherein the characteristic value or values are at least one of a gradient vector representing a gradient of density of pixels in the sample images or the face image, color information of the pixels therein, density therein, a characteristic in texture therein, depth information thereof, and a characteristic of an edge therein.

19. A photo card generation method comprising the step of generating the card having the face image by printing the data generated according to the photo card data generation method of claim 18.

20. A computer readable medium encoded with a computer program causing a computer to execute a photo card data generation method for generating data used for a card having a face image, the program comprising the steps of:
obtaining a face image by photographing the face of a person; detecting positions of eye centers in the face image;
obtaining a normalized face image by normalizing the face image so as to cause a distance between the positions to become a predetermined value;
cutting a card face image of a predetermined standard size from the normalized face image with reference to the distance between the positions of the eye centers in the normalized face image;
generating the data for the card having the face image, based on the card face image and personal information of the person from which the face image has been obtained;
characteristic value calculation means for calculating at least one characteristic value used for recognizing the positions of the eye centers from the face image, wherein the characteristic value or values are at least one of a gradient vector representing a gradient of density of pixels in the sample images or the face image, color information of the pixels therein, density therein, a characteristic in texture therein, depth information thereof, and a characteristic of an edge therein.

21. A program comprising the step of generating the card having the face image by printing the data generated according to the program of claim 20.

* * * * *